United States Patent [19]

Tanaka et al.

[11] Patent Number: 4,671,781
[45] Date of Patent: Jun. 9, 1987

[54] COOLING SYSTEM FOR A BELT TYPE TRANSMISSION

[75] Inventors: Kunihiko Tanaka; Hideo Ochiai, both of Tokyo; Yasuo Ikenoya, Saitama, all of Japan

[73] Assignee: Honda Giken Kogyo Kabushiki Kaisha, Tokyo, Japan

[21] Appl. No.: 762,055

[22] Filed: Aug. 1, 1985

[30] Foreign Application Priority Data

Aug. 3, 1984 [JP] Japan .................. 59-120098[U]
Aug. 8, 1984 [JP] Japan .................. 59-121541[U]

[51] Int. Cl.$^4$ ........................................... F16H 57/04
[52] U.S. Cl. ..................................... 474/93; 180/229
[58] Field of Search ................ 474/93, 185, 249, 146, 474/150; 180/84, 229

[56] References Cited

U.S. PATENT DOCUMENTS 4,493,677 1/1985 Ikenoya ............................. 474/93
4,531,928 7/1985 Ikenoya ............................. 474/93

FOREIGN PATENT DOCUMENTS 0109762 6/1983 Japan ............................. 474/93
0048308 8/1983 Japan ............................. 474/93
137663  8/1983 Japan .
59-9365 1/1984 Japan .
0054856 3/1984 Japan ............................. 474/93
59-54856 3/1984 Japan .

Primary Examiner—Stephen J. Novosad
Assistant Examiner—Thuy M. Bui
Attorney, Agent, or Firm—Lyon & Lyon

[57] ABSTRACT

A cooler for a belt type transmission in a power unit for vehicles in which a transmission casing is provided on one side of an engine body, and a belt type transmission composed of a drive pulley connected with the crankshaft of the engine body, a driven pulley connected with an output shaft and an endless transmitting belt engaged between the pulleys is contained in a transmitting chamber in the transmission casing, wherein an air intake passage and a rear air exhaust passage are respectively provided front and rear portions of the transmission casing, an intermediate air exhaust passage is provided in the intermediate between the front portion and the rear portion of the transmission casing, so that the inlet of the intermediate air exhaust passage is opened in the zone that the endless transmitting belt is isolated from the driven pulley at the tension side of the endless transmitting belt in the transmission chamber; and further wherein a suction port is opened in the outer wall of the transmission casing, a duct cover is mounted on the outer surface of the outer wall of the transmission casing to cover the suction port, and the air intake passage is defined by the duct cover and the outer wall of the transmission casing.

14 Claims, 14 Drawing Figures

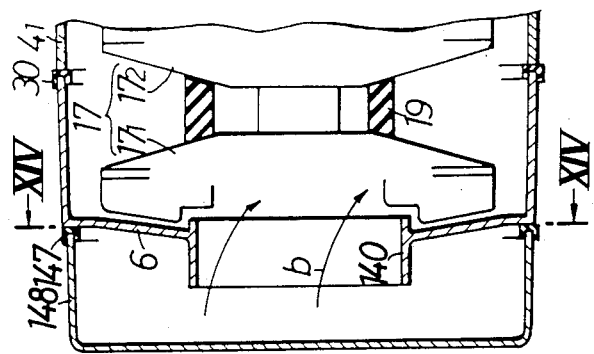
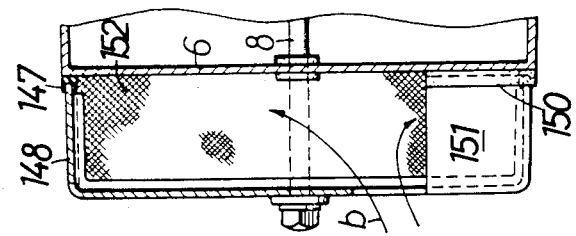
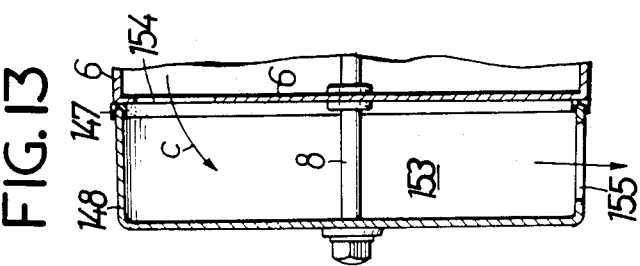

__4,671,781__

COOLING SYSTEM FOR A BELT TYPE TRANSMISSION

BACKGROUND OF THE INVENTION

1. Field of the Invention

The present invention relates to a forced air cooler for a belt type transmission contained in a power unit of vehicles such as motorcycles.

2. Description of the Prior Art

A cooler is known for forcibly air-cooling a belt type transmission in a transmission casing by forcibly introducing the open air into the transmission casing in a power unit for vehicles. The transmission casing is provided at one side of an engine body and the belt type transmission composed of a drive pulley connected with the engine body, a driven pulley connected with an output shaft and an endless transmitting belt engaged between the pulleys is contained in the transmission chamber of the transmission casing. This device is disclosed and known in Japanese Utility Model Publication Laid-open No. 101047/1983, for example.

However, in such conventionally known coolers for a belt type transmission operated in a transmission casing, the flow of cooling air introduced into the transmission casing typically interferes with an air stream generated by the operation of the belt type transmission such that the air flows partially collide with each other. This generates stagnation in the air to lower the cooling efficiency. Particularly when the belt type transmission is operated at high speeds, this trend disadvantageously increases.

In addition, in such coolers, a direct air intake passage is formed in the front portion of the transmission casing. Thus, there is limited space to increase the area of the passage. In this case, the flow rate of the air drawn into the transmission casing tends to become insufficient, thereby causing the cooling efficiency to decrease. Further, the structure of the entire cooler is complicated to disadvantageously increases its cost.

SUMMARY OF THE INVENTION

The present invention has been accomplished with the above circumstances in view, and its object is to provide a cooler for a belt type transmission in a power unit for vehicles, wherein cool air introduced into a transmission casing flows smoothly in the transmission casing without stagnation to efficiently cool the belt type transmission and then is externally exhausted. A large amount of air flows in the transmission casing without resistance to enhance the cooling efficiency, and the structure is simplified to decrease its cost.

To achieve the above object, according to a first aspect of the present invention, there is provided a cooler for a belt type transmission in a power unit for vehicles in which a transmission casing is provided on one side of an engine body, and a belt type transmission composed of a drive pulley connected with the crankshaft of the engine body, a driven pulley connected with an output shaft and an endless transmitting belt engaged between the pulleys is contained in a transmitting chamber in the transmission casing. An air intake passage and a rear air exhaust passage are respectively provided in the front and rear portions of the transmission casing. An intermediate air exhaust passage is provided in the intermediate portion between the front portion and the rear portion of the transmission casing such that the inlet of the intermediate air exhaust passage opens in the zone where the endless transmitting belt is isolated from the driven pulley at the tension side of the endless transmitting belt in the transmission chamber.

According to a second aspect of the present invention in a similar transmission, a fan is provided on the drive pulley. The suction port of the fan is opened at the outer wall of the transmission casing. A duct cover is mounted on the outer surface of the outer wall of the transmission casing to cover the suction port, and an air intake passage for introducing air into the transmission chamber is formed with the duct cover and the outer wall of the transmission casing.

With the above arrangements, the air, after cooling the belt type transmission, can be efficiently exhausted into the transmitting chamber without stagnation in the transmission chamber, and the belt type transmission can be effectively cooled even if the quantity of heat is increased by the high speed operation of the belt type transmission, thereby making it possible to prevent overheating.

In addition, with a fan provided on the drive pulley of the belt type transmission contained in the transmission chamber in a transmission casing, the suction port of the fan may be opened at the outer wall of the transmission casing. A duct cover can be mounted on the outer surface of the outer wall of the transmission casing between the duct cover and the outer wall of the transmission casing, and an air intake passage for introducing the open air into the transmitting chamber can be formed with the duct cover and the outer wall of the transmission casing. An air intake passage having a large suction port area can be provided without complicating the structure of the transmission casing itself in the transmission casing. Thus it is possible to largely improve the cooling air suction efficiency and to enhance the cooling efficiency of the belt type transmission.

Further, since an air intake passage is not formed in the transmission casing itself according to the second aspect of the present invention, the structure of the transmission casing itself can be simplified to reduct its cost.

Moreover, since an air intake passage is formed along the outer wall of the transmission casing, the transmission casing itself can be cooled with cool air flowed through the air intake passage, thus making it possible to further aid the cooling effect of the belt type transmission.

The above and other objects, features and advantages of the present invention will become apparent from the following description of a preferred embodiment taken in conjunction with the accompanying drawings.

DESCRIPTION OF THE DRAWINGS

FIG. 1 is a side view of the cooler according to the present invention as employed in a power unit for motorcycles;

FIG. 2 is a fragmentary enlarged sectional view of the cooler according to the present invention;

FIG. 3 is a developed sectional view taken along the line III—III of FIG. 2;

FIG. 4 is a sectional view taken along the line IV—IV of FIG. 2;

FIG. 5 is an inner side view of a cover case taken along the line V—V of FIG. 3;

FIG. 6 is a side view of a power unit having a cooler according to the present invention;

FIG. 7 is an enlarged sectional view taken along line VII—VII of FIG. 6;

FIGS. 8 to 14 illustrate a cooler according to still another embodiment of the present invention;

FIG. 8 is a side view of a cooler according to the present invention as employed in a power unit for motorcycles;

FIG. 9 is a partial fragmentary enlarged side view of the cooler of the present invention;

FIG. 10 is an enlarged sectional view taken along the line X—X of FIG. 9;

FIG. 11 is an enlarged sectional view taken along the line XI—XI of FIG. 8;

FIG. 12 is an enlarged sectional view taken along the line XII—XII of FIG. 8;

FIG. 13 is an enlarged sectional view taken along the line XIII—XIII of FIG. 8; and FIG. 14 is an inner view of a duct case along the line XIV—XIV of FIG. 11.

DESCRIPTION OF THE PREFERRED EMBODIMENTS

Figure 1:
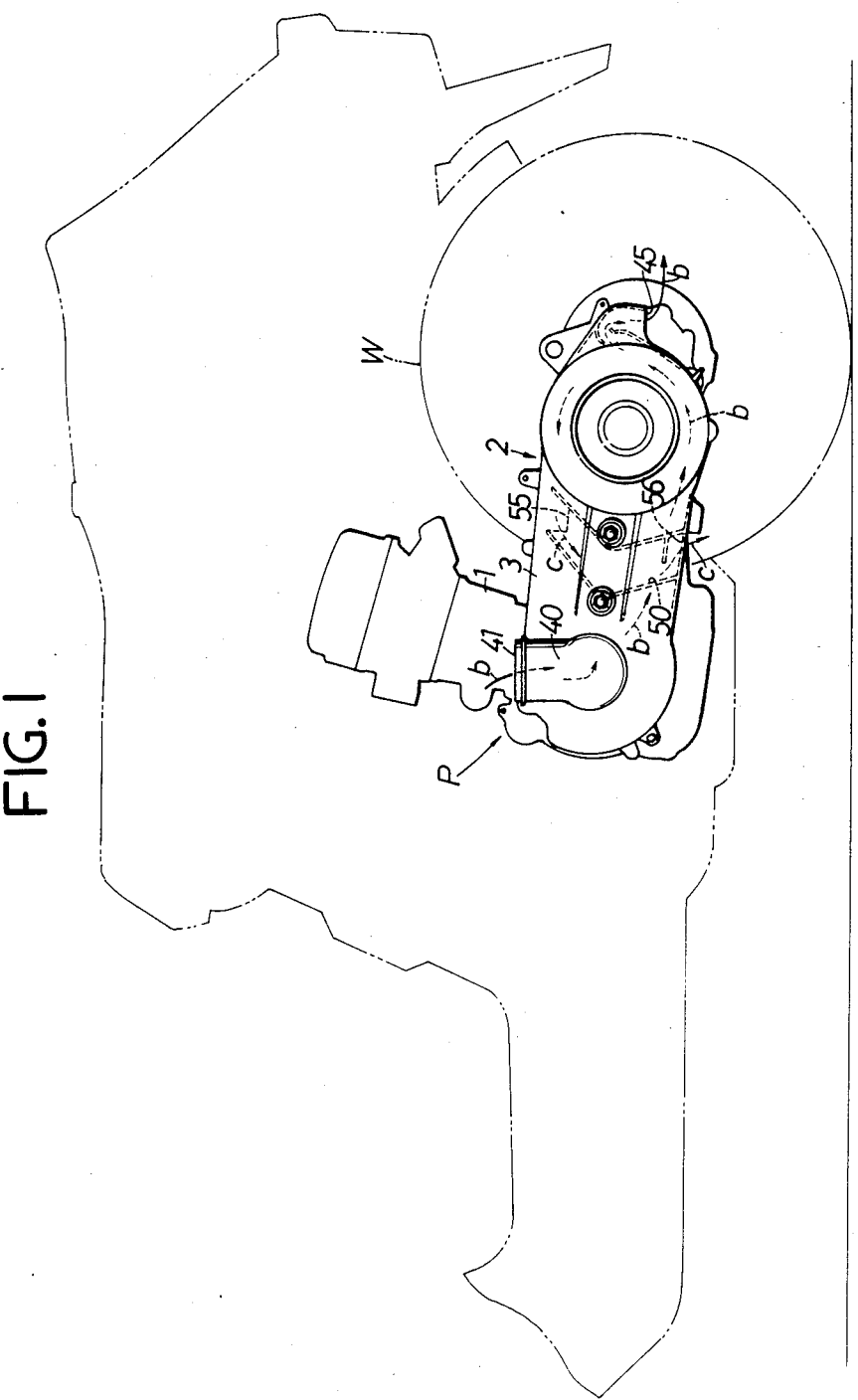
FIGS. 1 to 5 illustrate a belt type transmission in vehicles which includes a cooler according to an embodiment of the present invention.

The present invention will now be described by way of embodiments in which a cooler for a belt type transmission in a power unit for vehicles according to the present invention is applied in motorcycles with reference to the accompanying drawings. The same reference numerals applied to the different embodiments designate the same or equivalent members.

FIGS. 1 to 5 illustrate a first embodiment of the present invention. A power unit P is suspended to a motorcycle body, and comprises an engine body 1, a power transmitting portion 2 provided adjacent the lower portion of the body 1 on one side thereof and a rear wheel W suspended on the rear portion of the transmitting portion 2.

The transmitting portion 2 extends rearward from the lower portion of the engine body 1 and has a transmission casing 3 which is constituted of an outer wall $4_1$ of a crank casing 4, a transmission cover 5 secured to the rear portion of the outer wall by a connecting bolt 7, and a cover case 6 secured to the outer surfaces of the outer wall $4_1$ and the transmission cover 5 by connecting bolts 8 through an elastic sealing member 30. A crank chamber 9 forming a part of the engine body 1 is defined in the front portion of the crank casing 4, and a transmission chamber 10 is defined in the transmission casing 3 adjacent the crank chamber 9. A crank shaft 11 is rotatably provided transversely in the crank chamber 9 and has a crank pin to which a piston slidably fitted in a cylinder 13 of the engine body 1 is connected through a connecting rod 12. A gear chamber 15 is defined in the rear portion of the transmission casing 3 by the rear portion of the outer wall $4_1$ of the crank casing 4 and the transmission cover 5, and an output shaft 16 is rotatably provided through the gear chamber 15 in parallel with the crank shaft 11.

A transmission system, i.e., a V-belt type automatic transmission T, to be described in detail later, and a reduction gear mechanism R are contained in the transmission chamber 10 of the transmission casing 3. Since the stageless transmission T has a conventionally known structure by connecting the crank shaft 11 with the output shaft 16, the structure will be simply described.

A variable diameter drive pulley 17 is mounted on one end of the crank shaft 11, and a driven pulley 18 having a variable diameter larger than that of the drive pulley 17 is also mounted on one end of the output shaft 16. An endless V-belt 19 is stretched around these pulleys 17 and 18. The drive pulley 17 is comprised of a stationary drive pulley half $17_1$ secured to the crank shaft 11 and a movable drive pulley half $17_2$ axially slidably carried on the crank shaft 11. The movable drive pulley half $17_2$ is provided with a shifting weight roller 20 adapted to receive a centrifugal force to move the movable drive pulley half $17_2$ toward the stationary drive pulley half $17_1$. The driven pulley 18 consists of a stationary driven pulley half $18_1$ secured to a hollow pulley shaft 21 rotatably carried on the output shaft 16 and a movable driven pulley half $18_2$ carried on the pulley shaft 21 for axial sliding movement. The movable driven pulley half $18_2$ is biased toward the stationary driven pulley half $18_1$ by a spring 22.

An automatic starting centrifugal clutch C is mounted on the output shaft 16 on the outer side of the driven pulley 18. The clutch C has a conventionally known structure, so that the pulley shaft 21 is connected to the output shaft 16 through the clutch C when the speed of rotation of the pulley shaft 21 exceeds a set value.

A reduction gear mechanism R is incorporated in the gear chamber 15 defined by the rear portion of the outer wall $4_1$ of the crank casing 4 and the transmission cover 5. The output shaft 16, a reduction shaft 23 and wheel axle 25 rotatably extend transversely in the gear chamber 15 in parallel with one another. A drive gear 26 integral with the output shaft 16 is meshed with a first reduction gear 27 integral with the reduction shaft 24, and a second reduction gear 28 is meshed with a third reduction gear 29 integral with the wheel axle 25. The wheel axle 25 has a half projecting outside the gear chamber 15, and the rear wheel W is securely mounted on the projecting half. Therefore, when the operation of the engine body causes the crank shaft 11 to be rotated, this rotative movement is transmitted through the V belt type stageless transmission T and the centrifugal clutch C to the output shaft 16 and further through the reduction gear mechanism R to the rear wheel W.

An alternating current generator A is connected to the end of the crank shaft 11 which is on the opposite side of the stageless transmission T.

Figure 3:
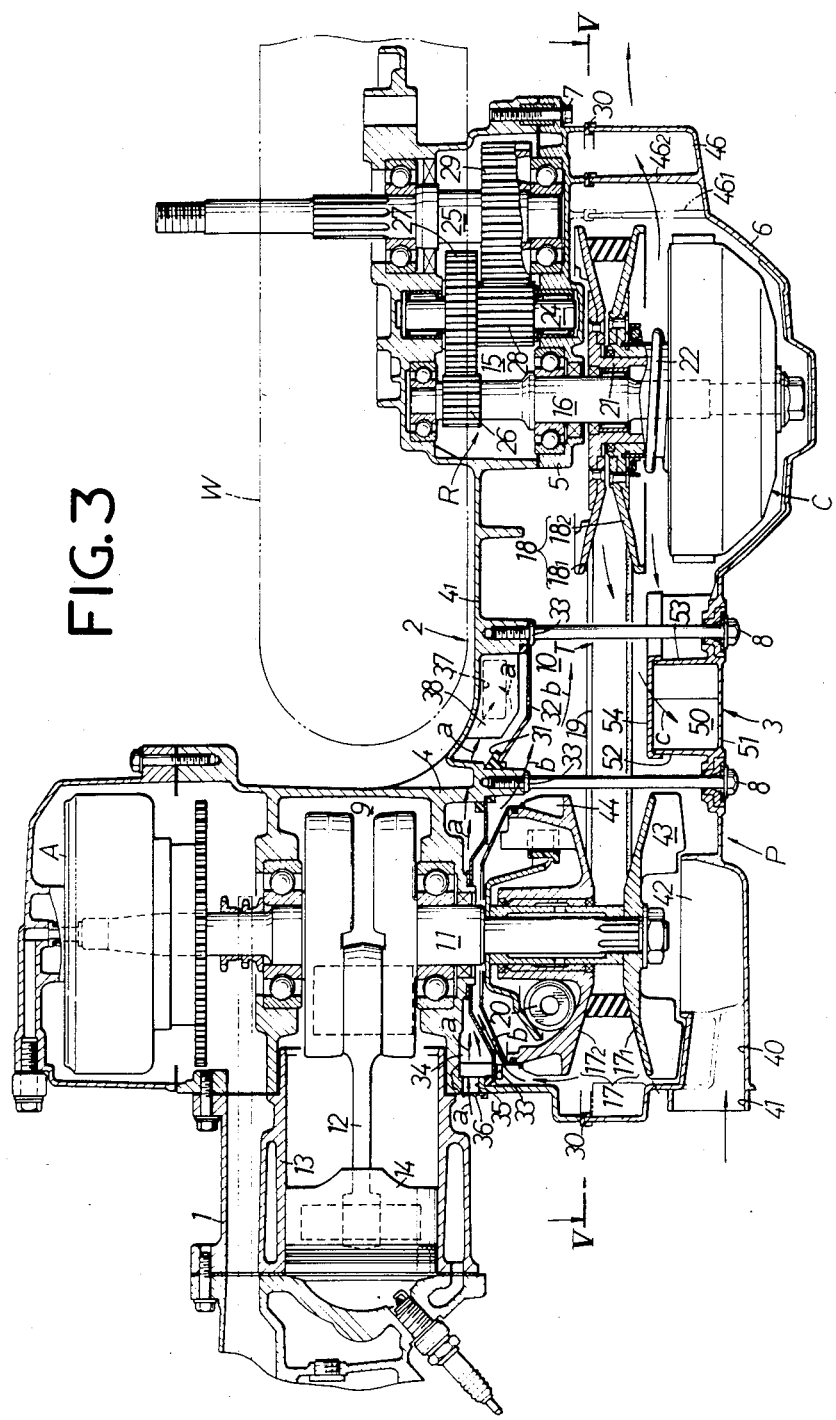
Figure 4:
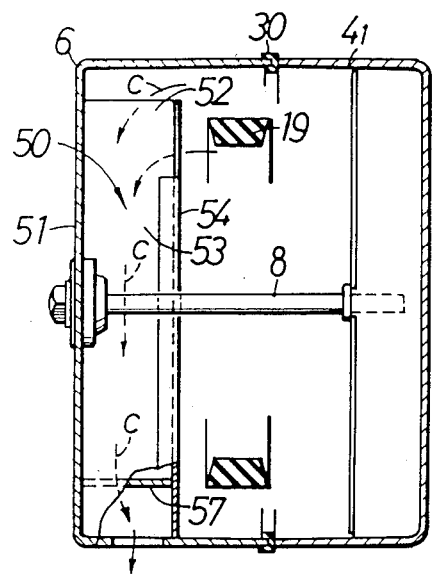

Referring to FIG. 3, a heat insulting plate 32 is secured on the outer surface of the outer wall $4_1$ of the crank casing 4 by a plurality of mounting bolts 33 with a resilient seal member 31 interposed therebetween. The plate 32 partially defines the transmission chamber 10. The heat insulating plate 32 also defines a longitudinally long air inducting passage 34 between the transmission chamber 10 and the crank chamber 9 in cooperation with the outer wall $4_1$ of the crank casing 4. An air inlet port 35 is opened in communication with the air passage 34 in the front wall of the crank casing 4, and a filter is mounted in front of the air inlet port 35. An air outlet port 37 is also opened in communication with the air passage 34 in the bottom of the outer wall $4_1$ of the crank casing 4 under the rear portion of the air passage 34. An air outlet wall 38 is provided integrally with the outer wall $4_1$ of the crank casing 4 above the air outlet port 37 to extend substantially horizontally therefrom. The air outlet wall 38 hangs over the air outlet port 37 to prevent a splash, dust or the like from entering the air passage 34. Therefore, when the vehicle travels, a part of the running air impinging against the front wall surface of the crank casing 4 flows into the air passage 34 through the air inlet port 35 and passes rearward through the air passage 34 as shown by an arrow a in FIG. 3, and thereafter, is discharged outside through the air outlet port 37. This causes a heat insulating air layer consisting of cool air to be formed between the crank chamber 9 and transmission chamber 10, so that heat generated from the operation of the engine body 1 may be insulated from the transmission chamber 10 and thus the stageless transmission T.

An air intake passage 40 is formed integrally with the side of the front portion of the cover case 6 for forming a part of the transmission casing 3, an air intake port 41 is opened upward at the outer end of the passage 40, and an air exhaust port 42 is opened in communication with the transmission chamber 10 opposite to the center of the drive pulley 17 at the inner end thereof.

A suction centrifugal fan 43 is provided integrally with the back surface of the stationary drive pulley half $17_1$ of the drive pulley 17. An axial flow fan 44 is provided integrally with the outer peripheral surface of the movable drive pulley half $17_2$ to induct the air introduced into the transmission chamber 10 along the outer periphery of the stageless transmission T, as shown by an arrow b in FIGS. 1 to 3.

A rear air exhaust passage 45 is opened at the rear wall of the cover case 6 at the rear of the driven pulley 18, and a roundabout passage 46 is formed by a plurality of baffle plates $46_1$ and $46_2$ immediately before the rear air exhaust passage 45.

Figure 2:
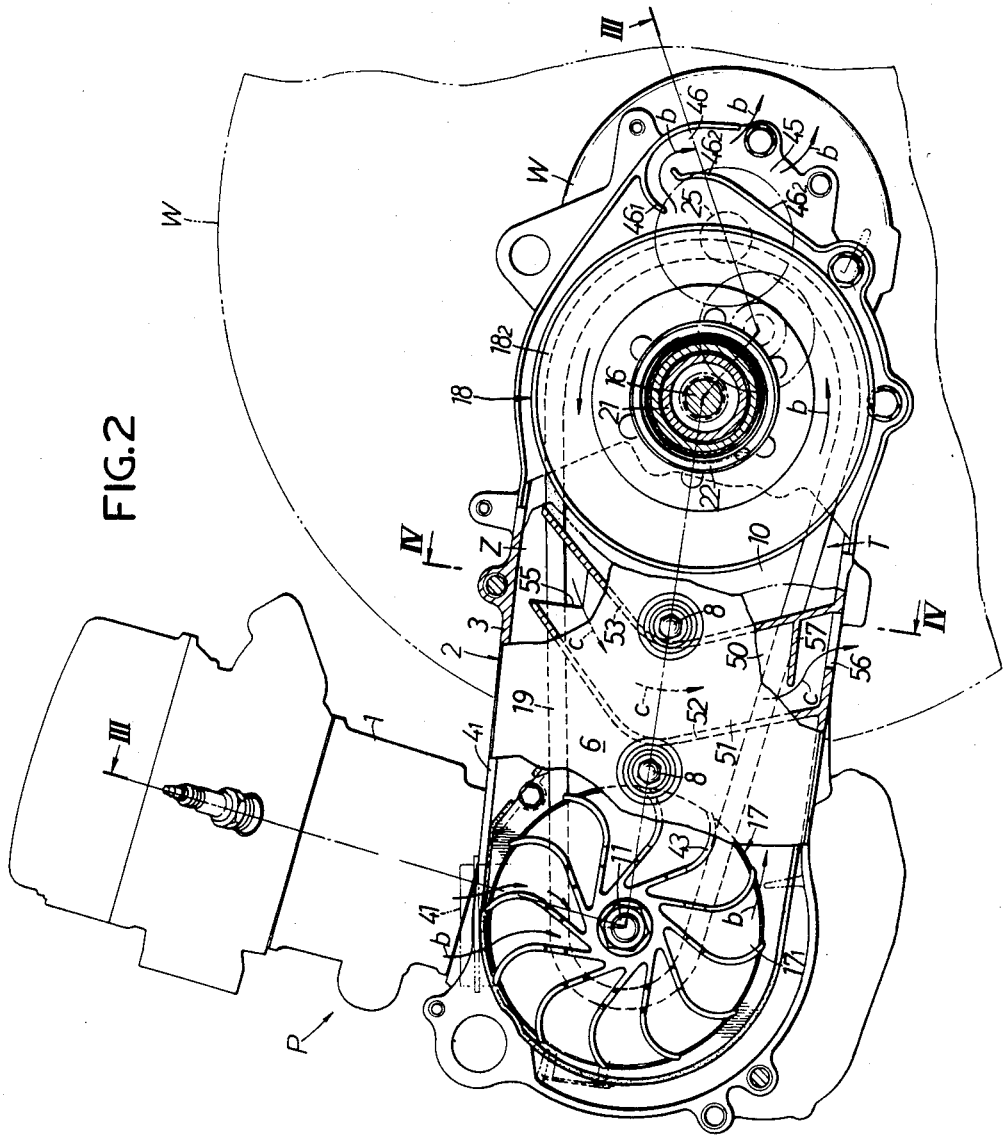
Figure 5:
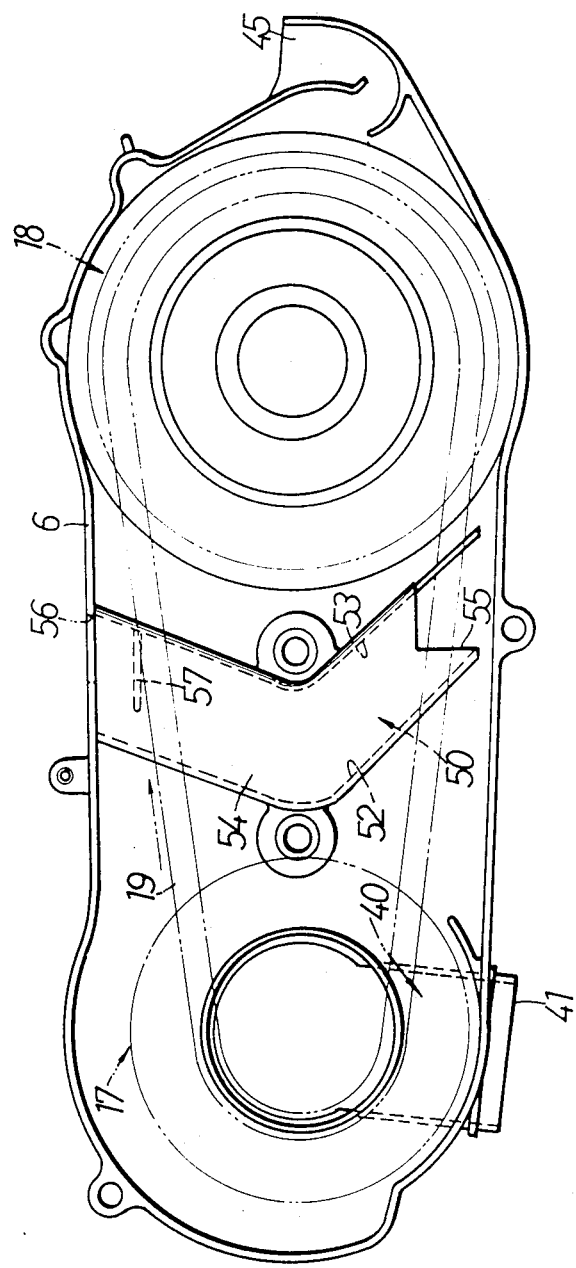

An intermediate air exhaust passage 50 is formed inside the longitudinally intermediate portion of the cover case 6 for defining a part of the transmission chamber 10. This passage 50 is defined in a chevron shape consisting of an outside wall 51 integral with the cover case 6, front and rear walls 52 and 53, and an inside wall 54 communicating between the inner ends of the front and rear walls 52 and 53, to project forward from the side as shown in FIGS. 2 and 5, and having a square shape in cross section, as shown in FIG. 3. The intermediate air exhaust passage 50 is open so that an inlet 55 is open in the zone Z. The V-belt 19 is isolated from the driven pulley 18 at the upper, tension side of the V-belt 19, and the air cooling the driven pulley 18 is inducted into the intermediate exhaust passage 50 through the inlet 55. The outlet 56 of the intermediate air exhaust passage 50 is open through the bottom of the cover case 6. A baffle plate 57 is disposed integrally with the rear wall 50 to cover the outlet 56 directly above the outlet 56. The baffle plate 57 stops splash, dust or the like from flowing from the exterior into the air exhaust passage 50.

The operation of the first embodiment of the present invention will now be described with reference to FIGS. 1 to 5.

In operation, if the engine is operated, the rotation of the crank shaft 11 is transmitted to the rear wheel W through the V-belt type stageless transmission T and the centrifugal clutch C, so that the gear ratio is automatically controlled depending upon the throttle operation and the travelling condition of the vehicle in a usual manner.

During travelling of the vehicle, the centrifugal fan 43 on the back surface of the stationary drive pulley half $17_1$ draws in air from the air intake port 41 into the transmission chamber 10 through the air intake passage 40. The axial flow fan 44 on the outer periphery of the movable drive pulley half $17_2$ inducts the cool air drawn into the transmission chamber 10 axially of the drive pulley 17. Thus, the heated portion of the drive pulley 17 where the pulley 17 contacts the V-belt 19 is effectively cooled by the open cool air. The air flowing along the outer periphery of the drive pulley 17 flows backward along the stageless transmission T in the transmission chamber 10 to cool the rear half including the driven pulley 18 of the transmission T, externally exhausted from the rear air exhaust passage 45.

The cool air flows backward in the transmission chamber 10 by the rotation of the drive pulley 17 in the transmission chamber 10 since the driven pulley 18 is rotated counterclockwise in FIG. 2, the air flow generated by the rotation of the driven pulley 18 flows forward in the zone Z. The V-belt 19 is isolated from the driven pulley 18 at the tension side of the V-belt 19 as shown in FIG. 2 causing flow against the flow of the cool air flowing backward as described above. Thus, the air flows would collide with one another to tend to generate a stagnation of the air to rise the pneumatic pressure. But since the inlet 55 of the intermediate air exhaust passage 50 opens in the zone Z, the rise of the pneumatic pressure in the zone Z described above can be discharged from the outlet 56 through the intermediate air exhaust passage 50 as shown by arrows c in FIGS. 1 to 3. Thus, the stagnation of the air is eliminated in the transmission chamber 10, and even if the temperature becomes higher than usual due to the high speed operation of the stageless transmission T, the transmission T can be effectively cooled.

Figure 6:
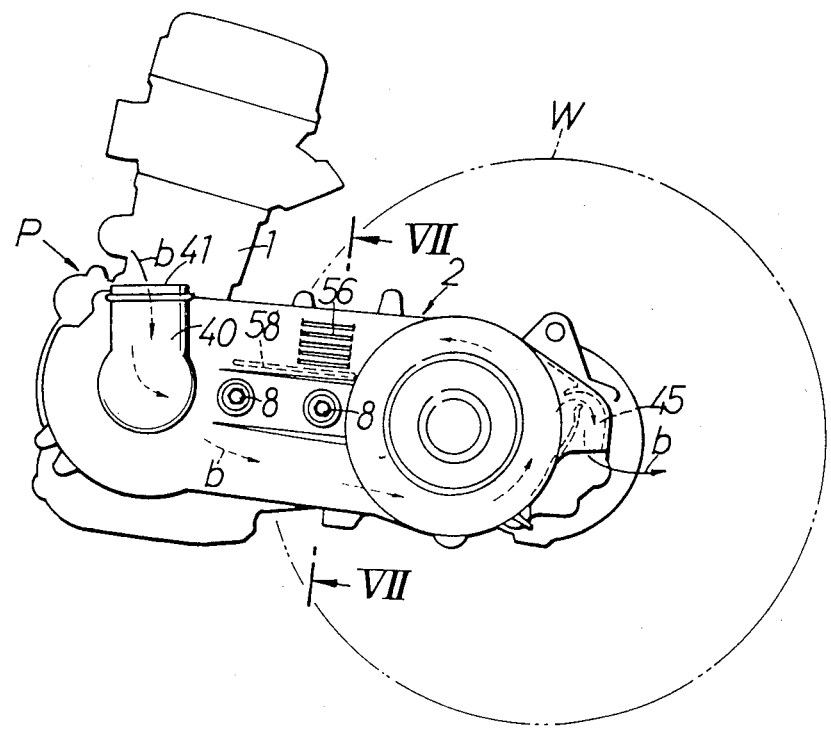
FIGS. 6 and 7 illustrate a cooler according to another embodiment of the present invention.
Figure 7:
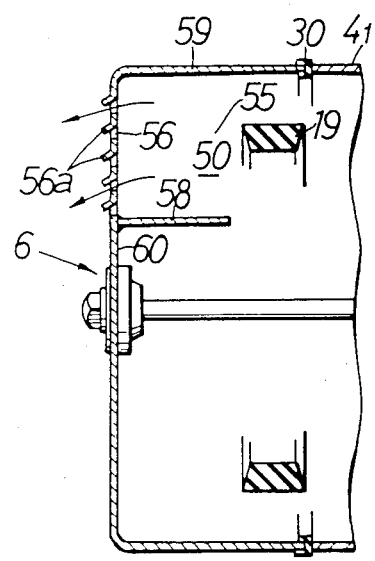

FIGS. 6 and 7 illustrate a second embodiment of the present invention. In the second embodiment, the construction of the intermediate air exhaust passage 50 is different from that of the first embodiment. A passage wall 58 is projected substantially horizontally inwardly in the upper front portion of the driven pulley 18 on the inner surface of the cover case 6 of the transmission casing 3, and the intermediate air exhaust passage 50 is formed of the passage wall 58 and parts of the upper wall 59 and the side walls 60 of the cover case 6. The inlet 55 of the exhaust passage 50 is opened in the upper front portion of the driven pulley 18, the outlet 56 is opened in the side of the cover case 6, and a louver 56a is provided in the outlet 56.

A third embodiment of the present invention will now be described with reference to FIGS. 8 to 14. In the third embodiment, the constitution of the air inlet port and the intermediate air exhaust passage is different from those of the first and second embodiments of the invention.

Figure 10:
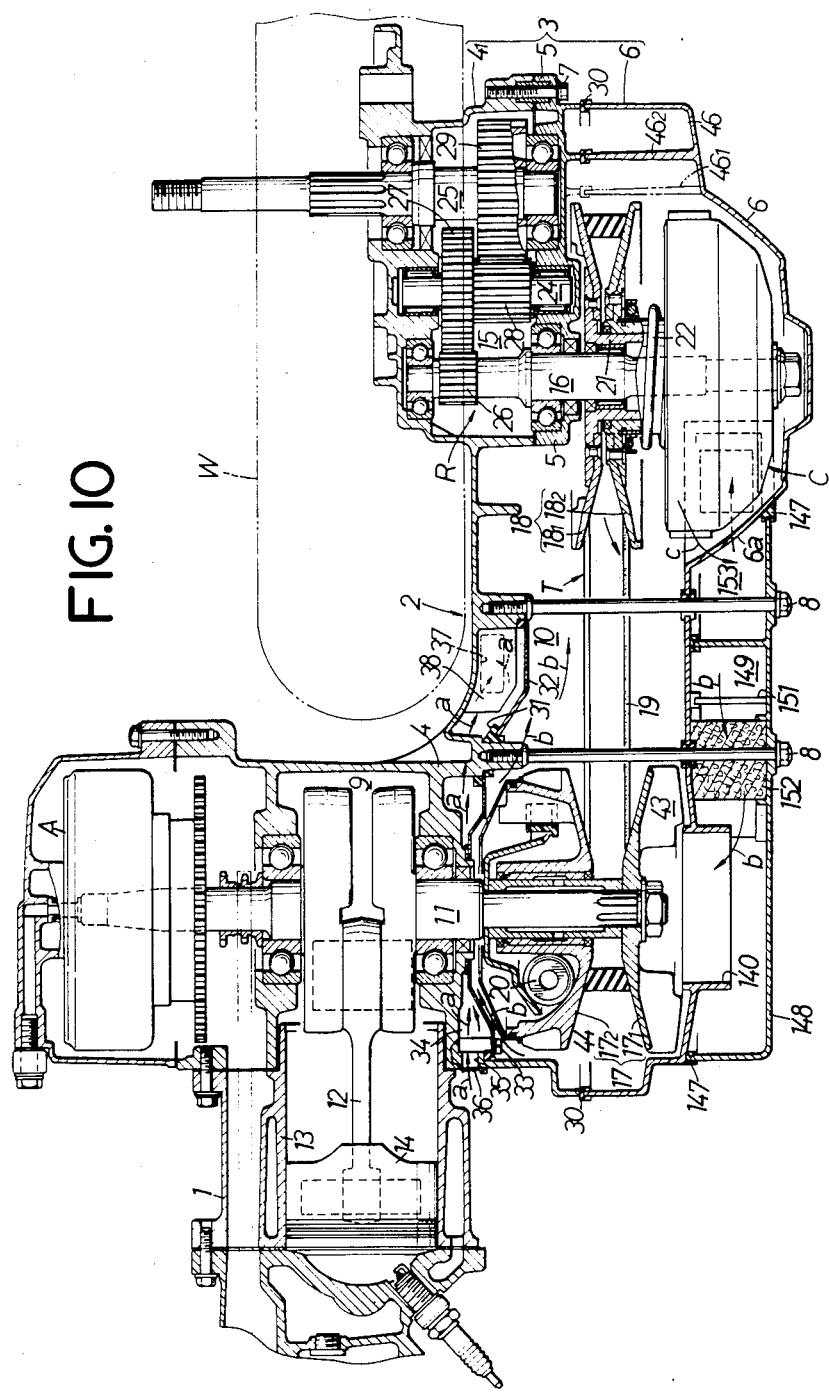

As shown in FIG. 10, a suction port 140 is open in the front wall of the cover case 6 in front of the suction port of the centrifugal fan 43 provided in the stationary drive pulley half $17_1$ of the drive pulley 17.

Figure 8:
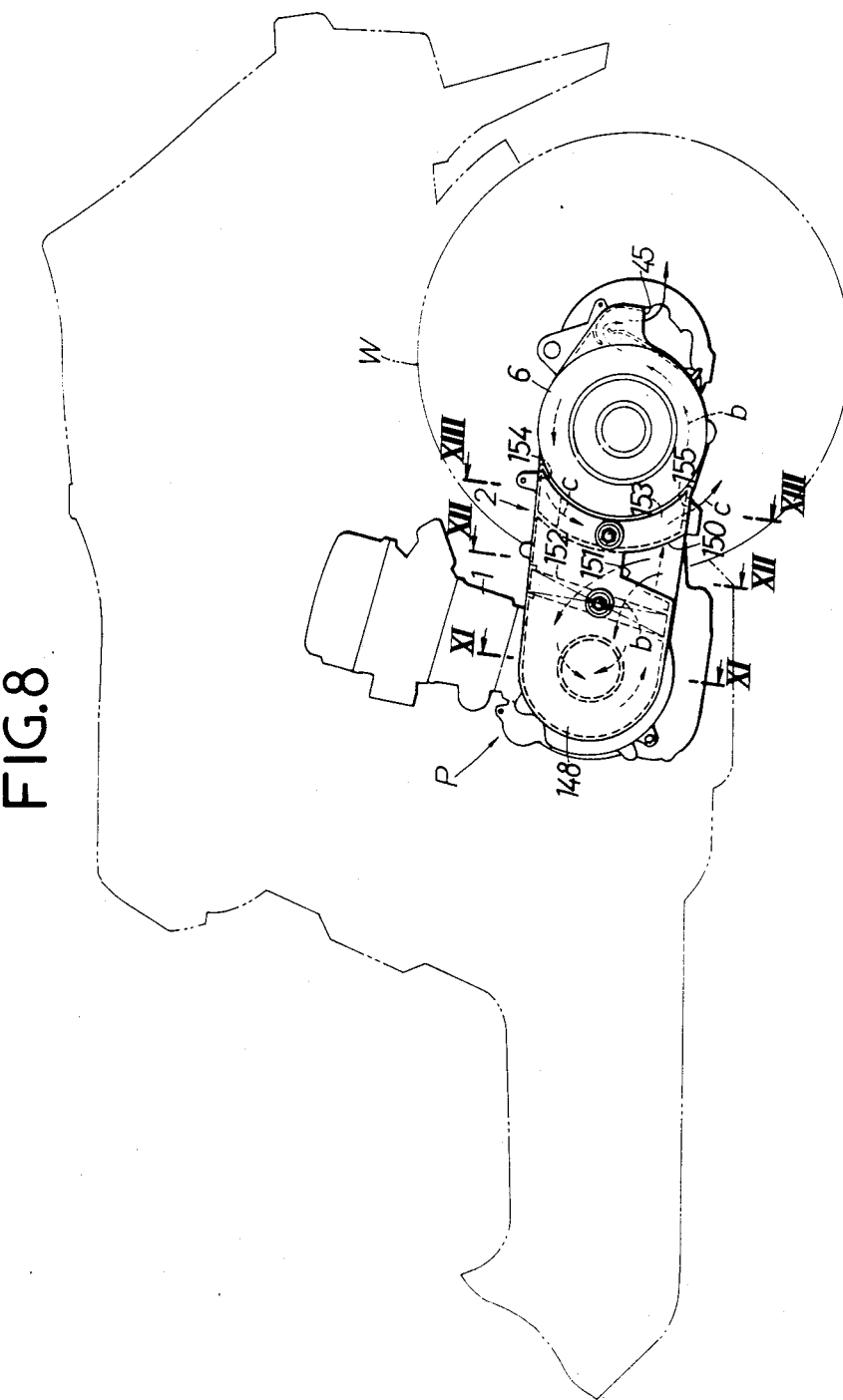
Figure 9:
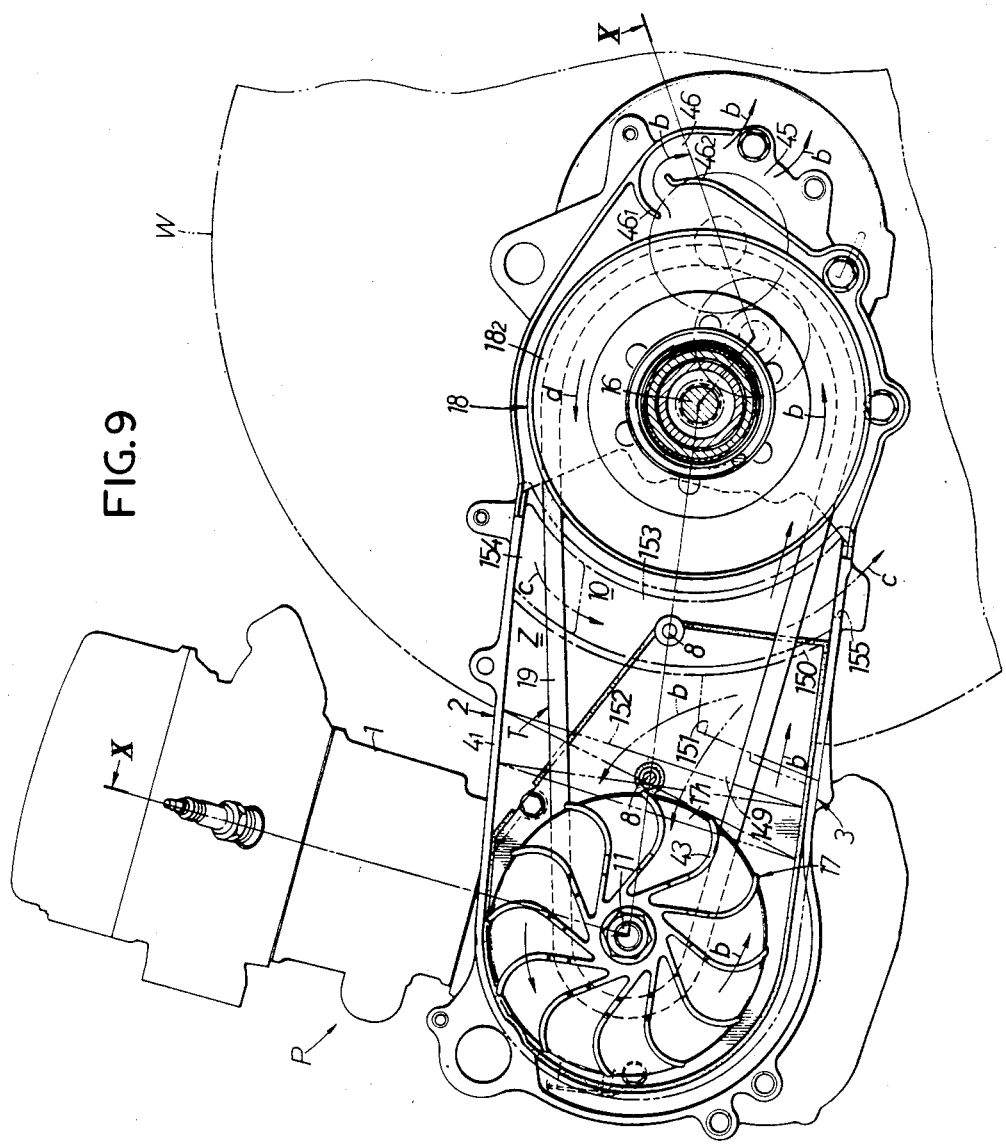
Figure 14:
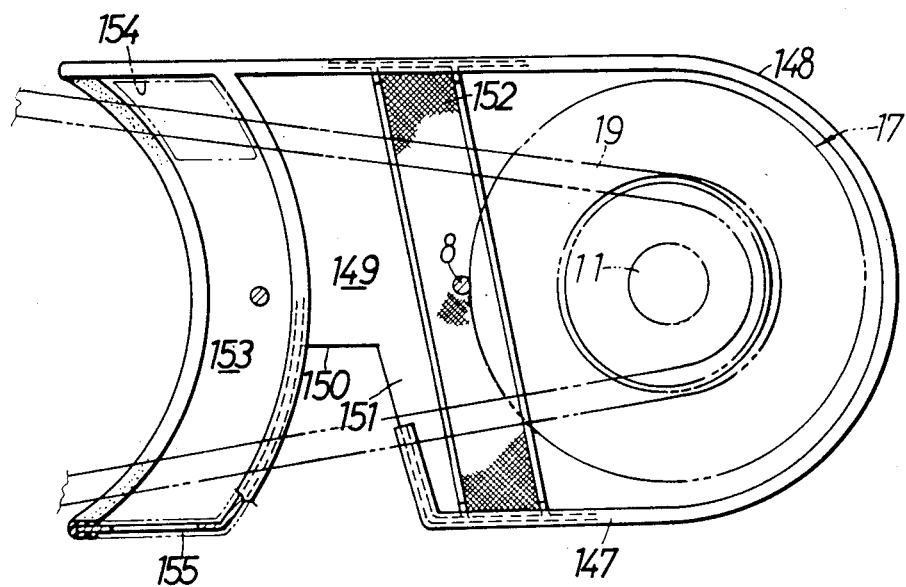

In addition, as shown in FIGS. 8 and 10, a duct cover 148 is located with connecting bolts 8 at the front half of the outer wall of the cover case 6 with a sealing member 147. This duct cover 148, as clearly shown in FIG. 14, is formed in a semielliptical shape as seen from the side to coincide with the front half of the cover case 6, and the rear edge thereof is formed in a recess arcuate shape adapted for a part of a conical swelled portion 6a provided on the rear half of the cover case 6. The dust cover 148 is formed with an air intake passage 149 having a long longitudinal length outside the transmission casing 3 to cover the suction port 140.

A substantially trapezoidal notch 150 is formed under the longitudinal intermediate portion of the duct cover 148, and an air intake port 151 is open in communication with the air intake passage 149 at the notch 150. A filter element 152 is supported on the inside of the duct cover 148 to cross the air intake passage 149, and the open air flowing into the air intake passage 149 from the air intake port 151 is filtered by the filter element 152. Further, an arcuate-shaped intermediate air exhaust passage 153 is defined inside the duct cover 148 at the rear from the notch 150. An inlet 154 is open in communication with the transmission chamber 10 in the transmission casing 3 from the passage 153 at the upper end of the air exhaust passage 153. An exhaust port 155 is open in communication with the exterior from the passage 153 in the bottom of the exhaust passage 153. The inlet 154 opens in the zone Z such that the tension side of the V-belt 19 is isolated from the driven pulley 18 to induct air cooling the driven pulley 18 into the intermediate exhaust passage 153 through the inlet 154.

The operation of the embodiment of the this present invention will now be described.

During travelling of the vehicle, the centrifugal fan 43 and the axial flow fan 44 are together driven by the rotation of the drive pulley 17. The cool air is inducted by the centrifugal fan 43 from the air intake port 151 into the air intake passage 149 formed in the duct cover 148 as shown by arrows b in FIGS. 8 to 10, filtered by the filter element 152 in the passage 149, and then drawn into the transmission chamber 10 through the suction port 140.

Then, the air drawn in cools the interior of the transmission chamber 10 in the same manner as the first embodiment, and is then exhausted externally. In this case, the air flow fed into the zone Z by the counterclockwise rotation with the pulley 18 as shown by an arrow d in FIG. 9 while cooling the pulley 18 is exhausted from the exhaust port 155 through the intermediate air exhaust passage 153 along an arrow c.

What is claimed is:

1. A cooler for a belt type transmission in a power unit for vehicles having an engine body, a transmission casing provided on one side of the engine body, and a belt type transmission composed of a drive pulley connected with the crankshaft of the engine body, a driven pulley connected with an output shaft and an endless transmitting belt engaged between the pulleys contained in a transmitting chamber in the transmission casing, wherein an air intake passage and a rear air exhaust passage are respectively provided front and rear portions of said transmission casing, an intermediate air exhaust passage is provided in the intermediate between the front portion and the rear portion of said transmission casing, so that the inlet of the intermediate air exhaust passage is opened in the zone that the endless transmitting belt is isolated from the driven pulley at the tension side of the endless transmitting belt in the transmission chamber.

2. A cooler for a belt type transmission in a power unit for a vehicle, the transmission having a drive pulley near the front of the power unit on the vehicle, a driven pulley near the back of the power unit on the vehicle and an endless belt engaged with the pulleys, comprising
a transmission case on the power unit and inclosing the belt type transmission;
an air intake passage communicating with the interior of said casing adjacent the drive pulley;
an air exhaust passage communicating with the interior of said casing at the back of the casing;
an intermediate air exhaust port communicating with the interior of said casing between the pulleys and adjacent the tension side of the belt;
a fan fixed to the drive pulley, said air intake passage extending to adjacent said fan; and
a cover fixed in sealed engagment with said casing, said cover including an opening therethrough, a passageway extending from said opening to said air intake passage, a filter in said passageway to filter flow therethrough, an intermediate air exhaust opening through said cover, and intermediate air exhaust passage to said exhaust opening from said intermediate air exhaust port, and a partition between said passageway and said intermediate air exhaust passage in said cover.

3. A cooler for a belt type transmission in a power unit for a vehicle, the transmission having a drive pulley near the front of the power unit on the vehicle, a driven pulley near the back of the power unit on the vehicle and an endless belt engaged with the pulleys, comprising
a transmission casing on the power unit and enclosing the belt type transmission;
an air intake passage communicating with the interior of said casing adjacent the drive pulley;
an air exhaust passage communicating with the interior of said casing at the back of the casing; and
an intermediate air exhaust port communicating with the interior of said casing between the pulleys and adjacent the tension side of the belt.

4. The cooler of claim 3 further comprising a fan fixed on the drive pulley.

5. The cooler of claim 4 wherein said fan is a radial flow fan and said air intake passage terminates adjacent the center of said fan.

6. The cooler of claim 3 further comprising a cover fixed in sealed enegagement with said casing, said cover including an opening therethrough and a passageway extending from said opening to said air intake passage, said opening being displaced laterally from said air intake passage along the outer surface of said casing.

7. The cooler of claim 6 wherein said cover further includes a filter positioned in said passageway to filter all flow therethrough.

8. The cooler of claim 6 wherein said opening is generally below said intake passage.

9. The cooler of claim 6 wherein said cover further includes an intermediate air exhaust passage extending from said intermediate air exhaust port downwardly between said cover and the outer surface of said casing, and an exhaust opening at the lower end of said intermediate air exhaust passage.

10. The cooler of claim 3 wherein said intermediate air exhaust port has a downwardly extending intermediate air exhaust passage and an intermediate air exhaust opening at the lower end of said intermediate air exhaust passage.

11. The cooler of claim 10 wherein said intermediate air exhaust passage extends within said casing.

12. The cooler of claim 10 wherein said intermediate air exhaust passage extends outwardly of said casing.

13. The cooler of claim 10 wherein said intermediate air exhaust passage extends downwardly and forwardly at said intermediate air exhaust port and extends downwardly and rearwardly at said intermediate air exhaust opening.

14. The cooler of claim 3 wherein said intermediate air exhaust port is in direct communication with the exterior of said casing and includes louvers across said port.

* * * * *